United States Patent [19]
Ananda

[11] Patent Number: 5,638,513
[45] Date of Patent: Jun. 10, 1997

[54] SECURE SOFTWARE RENTAL SYSTEM USING CONTINUOUS ASYNCHRONOUS PASSWORD VERIFICATION

[76] Inventor: Mohan Ananda, 15910 Ventura Blvd., Suite 800, Encino, Calif. 91436

[21] Appl. No.: 482,429

[22] Filed: Jun. 7, 1995

Related U.S. Application Data

[63] Continuation of Ser. No. 178,398, Dec. 22, 1993.

[51] Int. Cl.$^6$ ............................................. C06F 11/00
[52] U.S. Cl. .......................... 395/188.01; 395/187.01; 395/185.01; 380/3; 380/23
[58] Field of Search .................... 395/188.01, 187.01, 395/186, 185.02, 185.01; 380/4, 25, 3, 23

[56] References Cited

U.S. PATENT DOCUMENTS

| | | | |
|---|---|---|---|
| 4,562,306 | 12/1985 | Chou et al. | 377/28 |
| 4,949,254 | 8/1990 | Orbach | 364/401 |
| 4,970,504 | 11/1990 | Chen | 340/825.31 |
| 4,998,806 | 3/1991 | Chernow et al. | 364/900 |
| 5,047,928 | 9/1991 | Wiedemer | 364/406 |
| 5,109,413 | 4/1992 | Comerford et al. | 380/4 |
| 5,166,886 | 11/1992 | Molnar et al. | 364/479 |
| 5,311,596 | 5/1994 | Scott et al. | 380/33 |
| 5,481,611 | 1/1996 | Owens et al. | 380/25 |
| 5,495,411 | 2/1996 | Ananda | 364/401 |
| 5,548,645 | 8/1996 | Ananda | 380/4 |
| 5,553,139 | 9/1996 | Ross et al. | 380/4 |
| 5,553,143 | 9/1996 | Ross et al. | 380/3 |

*Primary Examiner*—Robert W. Beausoliel, Jr.
*Assistant Examiner*—Norman M. Wright
*Attorney, Agent, or Firm*—Hecker & Harriman

[57] ABSTRACT

The present invention is a system for providing secure access and execution of application software stored on a first computer by a second computer using a communication device while a communication link is maintained between the first and second computers. More specifically, the present invention is a secure software rental system. The system enables a user in a remote location using a personal computer and a modem to connect to a central rental facility, transfer application software from the central rental facility to the remote computer, and execute the application software on the remote computer while electronically connected to the central rental facility. When the communication link between the central rental facility and the remote computer is interrupted or terminated, the application software no longer executes on the remote computer. This is accomplished by integrating header software with the application software according to the present invention. The application software stored on the central rental facility is integrated with the header software to provide a security feature of present invention. The use of header software allows the user to execute the application software only while the user is electronically connected to the central rental facility continuously. This prevents the user from copying the application software to a storage device of the remote computer, and subsequently executing the application software after interrupting or terminating the communications link between the central rental facility and the remote computer.

16 Claims, 14 Drawing Sheets

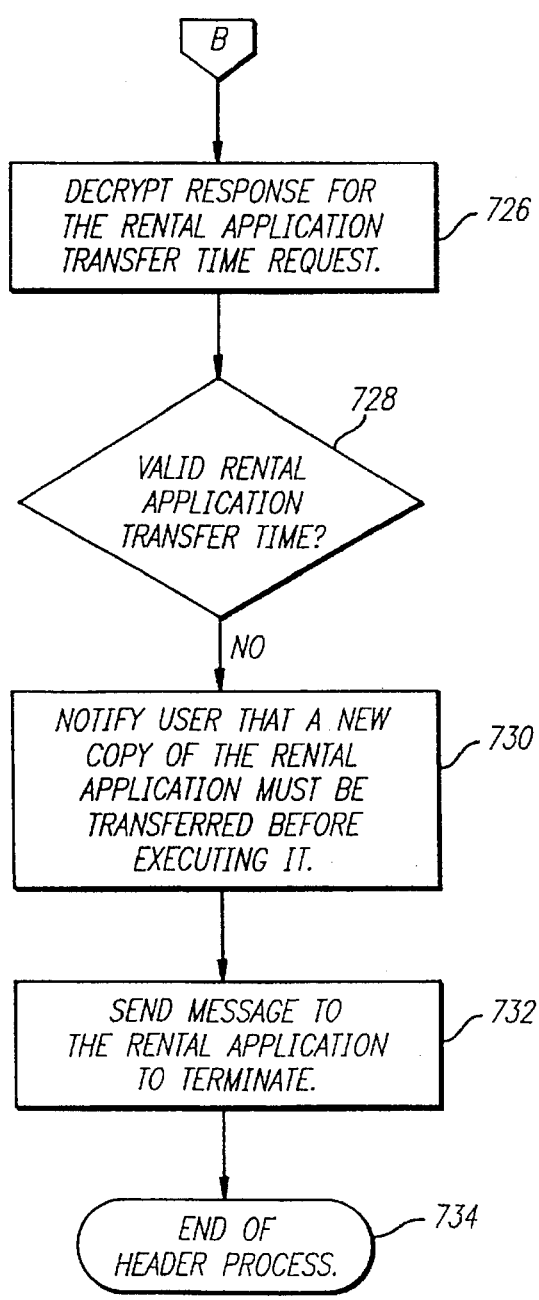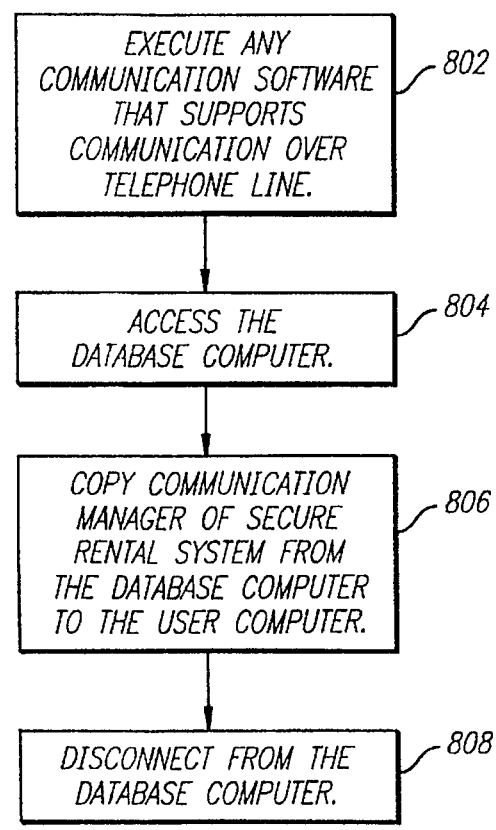

SECURE SOFTWARE RENTAL SYSTEM USING CONTINUOUS ASYNCHRONOUS PASSWORD VERIFICATION

This is a continuation of application Ser. No. 08/178,398, filed Dec. 22, 1993.

BACKGROUND OF THE INVENTION

1. Field of the Invention

The present invention relates to the field of secure software rental systems.

2. Background Art

The use of personal computers (PC) and communication modems (CM) has increased significantly in recent years and is expected to continue to grow. Using electronic mail capabilities, PC users communicate more frequently amongst themselves. Additionally, centralized computer systems have evolved allowing PC users to access large databases. Such databases include various information libraries: news, weather, sports, stock markets, entertainment, education, and so on. Access to such databases is commonly controlled so that users must subscribe to the centralized computer systems. In a typical session, the user connects to the centralized computer system using the PC, transfers information to the user's PC, and is further useable without being connected to the database of the centralized computer system. The centralized computer system enables a large number of users to concurrently access the database of the central computer system.

While centralized computer systems frequently provide access to information databases, such systems less frequently provide access to copyrighted application software. The primary reason for not providing copyrighted application software from databases of centralized computer systems is due to a lack of tamper-proof security methods and apparatuses for preventing unauthorized copying of copyrighted application software. Prior art systems do not provide a comprehensive method or apparatus for permitting the rental of copyrighted application software without having any possibility of the copyrighted application software being copied and used without being connected to the database.

A prior art system, disclosed in U.S. Pat. Nos. 4,796,181 and 5,047,928 issued to John D. Wiedemer on Jan. 3, 1989 and Sep. 10, 1991, respectively, implements a computer software security and billing system that enciphers an application program using a numeric key. The computer of the user requires a hardware security device and a removable billing device. Both devices carry unique codes. The security device containing the billing device is coupled to the user's computer. A security program accesses the application software and writes billing information into the billing device. The billing module must be periodically replaced so the user can be charged for the software usage. Thus, the system of Wiedemer is directed to a security device including a billing device that is installed in a user's computer for enciphering/deciphering software and billing for usage of the software. This system disadvantageously requires special hardware for billing use of application software and does not use a dynamic password for preventing unauthorized use of application software.

Another prior art system, disclosed in U.S. Pat. No. 4,999,806 issued to Fred Chernow, et al., on Mar. 12, 1991, is a system for distributing software by telephone. A central station accepts credit card information, transmits an acceptance code to a caller, and terminates the call. The central station first verifies the caller's credit card, and then calls back the caller. The transaction is continued after receiving the acceptance code. The central station transfers a control transfer program and initialization program to the caller. The caller (or purchaser) executes the initialization program so that the central station can control the caller's computer. The control transfer program then transfers a protection program for ensuring that a copying program is not resident in the memory of the caller's computer. A storing program is then transferred to the caller's computer for modifying the purchased program for storage on the caller's computer. The purchased program is then transferred to the caller's computer. During execution of the system for distributing software, the various transmitted programs are erased so that only a copy of the purchased software remains on the caller's computer. Thus, the system of Chernow, et at., is directed to a system of transmitting copy protected versions of software to a caller's computer for a limited amount of time similar to a demonstration. The system of Chernow et al., is similar to copy protection of software and does not use a dynamic password for preventing unauthorized use of application software.

A further prior art system, disclosed in U.S. Pat. No. 5,138,712 issued to John R. Corbin on Aug. 11, 1992, implements a method and apparatus for licensing software on a computer network. Encrypted license information is stored in a license token, and is sorted in a database controlled by a license server. To access a program, the license server locates the correct license token for a software application and transmits the license token to a license library. The application has an attached application specific license access module that decodes the licensing token. The license information is verified by license library routines coupled to the software application. The license is then checked out and the license token is updated. The application specific license access module encodes the updated license token before returning it to the license server. Thus, only a single application can be breached by unauthorized cracking of an encrypted application. Thus, the system of Corbin is directed to providing network protection against unauthorized use of software in a computer network.

Thus, the prior art is not able to provide a dynamic secure software rental system.

SUMMARY OF THE PRESENT INVENTION

The present invention is a system for providing secure access and execution of application software stored on a first computer by a second computer using a communication device while a communication link is maintained between the first and second computers. More specifically, the present invention is a secure software rental system. The system enables a user in a remote location using a personal computer and a modem to connect to a central rental facility, transfer application software from the central rental facility to the remote computer, and execute the application software on the remote computer while electronically connected to the central rental facility. When the communication link between the central and remote computers is interrupted or terminated, the application software no longer executes on the remote computer. This is accomplished by integrating header software with the application software according to the present invention.

The application software stored on the central rental facility is integrated with the header software to provide a security feature of the present invention. The use of header software allows the user to only execute the application software while the user is electronically connected to the central rental facility continuously. This prevents the user from copying the application software to a storage device of the remote computer, and subsequently executing the application software after interrupting or terminating the communications link between the central and remote computers.

The system of the present invention comprises a plurality of remote computers, communication modems, a multiuser communication modem, a database computer, and a memory system. The user connects the remote computer to the database of the central rental facility using methods well-known in the art of computer communications. However, the central rental facility requires the user to provide a unique user identification password to access the system. Each user of the system is allocated a unique user identification password.

A plurality of users having remote computers are able to communicate with the central rental facility using multiuser communication modem coupled to the central rental facility. The database computer comprises a multiuser, multitasking controller, password validation modules, user registration databases, and memory system. When a user transmits a password to the central rental facility, the central rental facility activates the user registration database through the user password module. The user registration database contains information about each user that is stored in a separate file for each user. The user validation module compares the password with the password stored in the user registration database for the user. When the password is validated, the controller of the central rental facility establishes continuous connection with the remote computer of the user. Otherwise, communications with the remote computer are terminated.

When the continuous connection between the central rental facility and the remote computer is established, the user is able to access rental application software database through a directory request module of the central rental facility. The multiuser controller of the central rental facility initiates the interface between the user and the rental application software database. The user is then able to select application software from the rental application software database. When the user selects a software application, the multiuser controller of the central rental facility transfers the software application to the remote computer using a file transfer module. The software is transmitted through the multiuser communication modem of the central rental facility and the communication modem of the remote computer to the user.

When the application software is transferred to the remote computer, the central rental facility registers a transfer time. The transfer time is temporarily stored in the user file for transfer of the application software. The temporary storage on the central rental facility is only maintained during the time that the user is continuously connected to the central rental facility. The multiuser controller of the central rental facility stores the transfer time of each application software that the user transfers in a separate file. The multiuser controller also transmits a message containing the transfer time and an identification number for each transmitted application software to the remote computer. The message is encrypted by the central rental facility before transfer, and transmission of the message is accomplished transparently to the user. The user is then able to execute the application software.

The application software executes normally on the remote computer without any apparent modification of the application software. However, each application software of the rental application software database is modified to include header software. The application software is coupled to the header software by interface parameters. When executing the application software, the header software is an integral part of the application software and is executed as part of the initialization process for the application software. The interface parameters are adapted to the application software although the header software is the same for all application software. The internal functions of the header software includes a rental security manager, user processor clock interface, user operating system interface, and user display interface. The header software primarily carries out dynamic password verification, which is an asynchronous process with respect to the functions of the application software and is carried out at finite intervals of time.

The rental security manager performs functions including interfacing with the communication manager that in turn interfaces with the communication modem, interfacing with the controller of the central rental facility, and interfacing with the application software. Also, the rental security manager generates passwords, correlate passwords, executes authorization verification, continues authorization verification, and terminates execution of the application software. The user processor clock interface obtains the current time from the user processor at finite intervals and provides it to the rental security manager. The user operating system interface determines the appropriate interface parameters for executing the application software on the operating system on the remote computer. The user display interface generates and provides messages to the user as necessary.

When the user executes the application software, file rental security manager initiates authorization verification. The authorization verification process begins by obtaining the time through the user processor clock interface. The rental security manager decrypts the authorization verification message containing the rental application software transfer time from the central rental facility. It determines the time difference between the transfer time from the central rental facility and the user processor clock time of the remote computer. The rental security manager generates a new authorization verification password using the time difference and the user identification password. It stores the new authorization verification password temporarily in a store of the rental security manager. The rental security manager then prepares a message containing the clock time, the user identification password, and identification number of the application software. The rental security manager encrypts the message, and transfers it to the central rental facility.

The multiuser controller of the central rental facility decrypts the transmitted message. It then computes a time difference by differencing the user processor clock time and the transfer time. The transfer time was stored previously in the user file for the application software. The multiuser controller generates an authorization verification password using the time difference computed by the controller and the decrypted user identification password. The multiuser controller creates a new message containing the processor clock time, the user identification password, and the authorization verification password. The message is encrypted by the multiuser controller, and transmitted to the remote computer.

The rental security manager decrypts the received message. The decrypted message is compared against the stored user processor clock time, the user identification password, and the authorization verification password using the password correlation module. When the password correlation module completes successfully, the authorization verification process is completed and the application software continues to execute. Otherwise, the authorization verification fails and termination of the executing application software is initiated. The user is notified of the authorization verification failure. The system performs the authorization verification process three times consecutively when failures occur before terminating the application software execution. The above listed steps are repeated at fixed time intervals during execution of the application software. The authorization verification process occurs transparently to the user when successful.

The authorization verification method thus prevents the user from circumventing the rental scheme in three ways. In one case, it prevents the user from transferring the application software to the remote computer and disconnecting the communication link while executing the application software. This attempt fails because the rental security manager is unable to communicate with the central rental facility. In another case, the authorization verification method prevents the user from copying the application software to a storage device, disconnecting the communication link, and re-executing the application software. This attempt fails because the transfer time is not available or the rental security manager is unable to communicate with the central rental facility. In yet another case, it prevents the user from establishing a communication link and re-executing a previously copied version of the application software that was stored on the remote computer. This attempt fails because the previous transfer time cannot be found on the central rental facility.

The present invention provides a secure system for allowing remote execution of rental application software and monitoring the time period that the application software is executed. The system also allows a single user to access more than one application software while independently monitoring each execution of application software using the multiuser, multitasking controller of the central rental facility. The multiuser, multitasking controller of the central rental facility is also capable of interfacing with a plurality of users concurrently.

BRIEF DESCRIPTION OF THE DRAWINGS

FIGS. 7A-7B are flow diagrams further illustrating FIG. 6;

FIG. 8 is a flow diagram illustrating transfer of a communication manager from the central rental facility to the remote user computer system;

DETAILED DESCRIPTION OF THE PRESENT INVENTION

A method and apparatus for providing a secure software rental system is described. In the following description, numerous specific details, such as number and nature of messages, communication applications, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

The Secure Software Rental System and a User Computer

Figure 1:
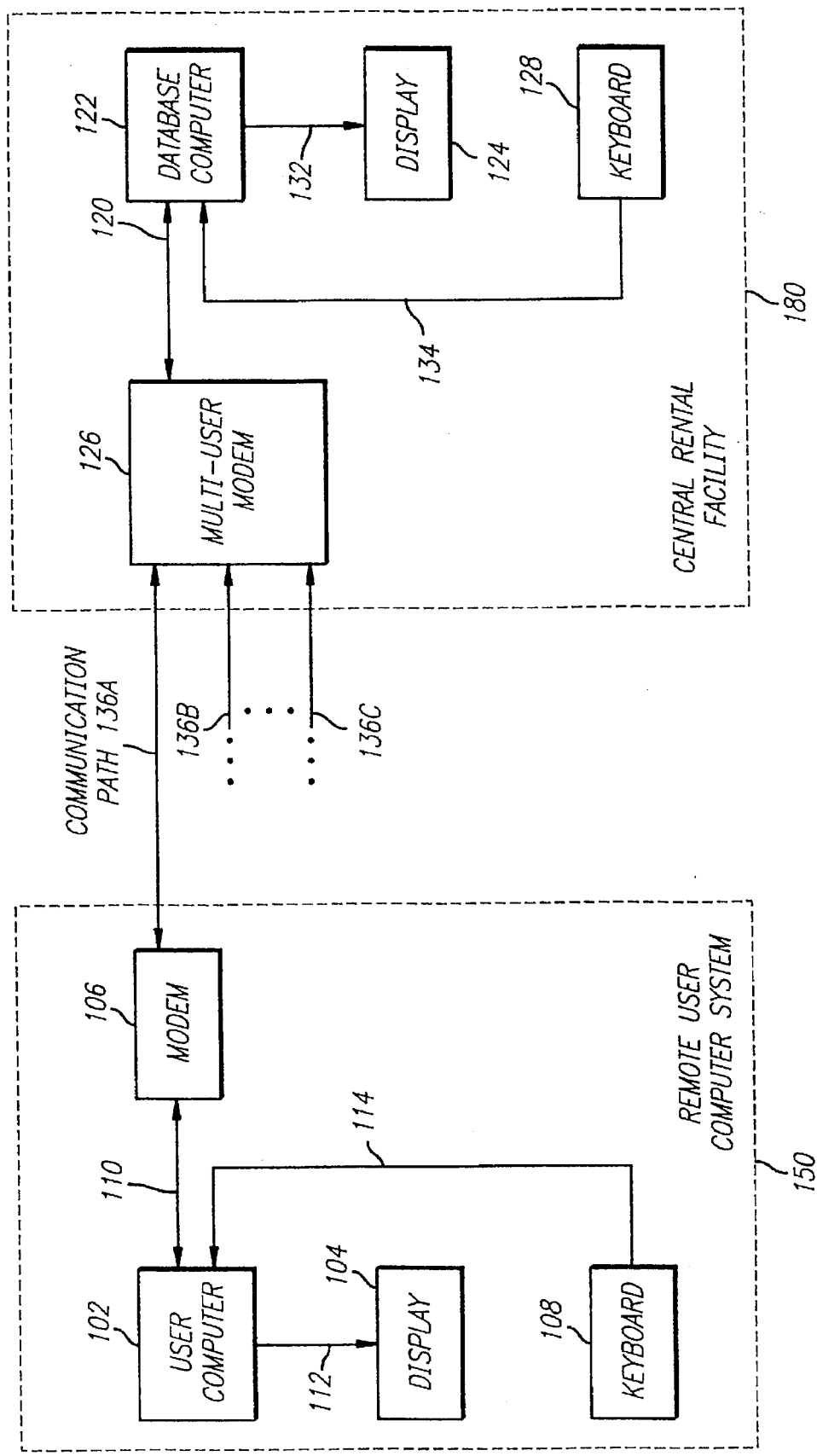
FIGS. 1 is a diagram illustrating a remote user computer system and a central rental facility.

FIG. 1 is a diagram illustrating a remote user computer system 150 connected to a central rental facility 180 by electronic communications path 136A for securely renting software. The remote user computer system 150 includes user computer 102, a display device 104, a keyboard 114, and a communication modem 106. The central rental facility 180 includes database computer 122, a display device 124, a keyboard 128, and a multiuser communication modem 126. Coupling 112 connects user computer 102 to display 104 for providing output to a user. Coupling 114 connects keyboard 108 to user computer 102 for providing input from a user. Modem 106 is connected to user computer 102 by coupling 110.

Modem 106 of remote user computer system 150 is coupled to multiuser communication modem 126 by communication path 136A. In the preferred embodiment of the present invention, communication path 136A is a telephone transmission line. The present invention is not limited to a telephone transmission line, and other communication paths may be utilized without departing from the scope of the present invention. Multiuser modem 126 is coupled to a plurality of communication paths 136A-136C for establishing communications with a plurality of remote user computer systems concurrently. Multiuser modem 126 is connected to database computer 122 by coupling 120. Coupling 132 connects database computer 122 to display 124 for providing output to an operator. Coupling 114 connects keyboard 128 to database computer 122 for providing input from an operator. While a single keyboard 128 and display device 124 are illustrated in FIG. 1, it should be apparent to a person skilled in the art that the present invention may be practiced with a plurality of such devices coupled to the database computer.

The user computer 102 of the remote user computer system 150 comprises a processing means coupled to main memory (e.g., random access memory RAM and/or read only memory ROM), secondary storage means (e.g., media storage systems and/or CDROM), and input/output ports for communicating with other devices including keyboards, printers, displays, etc. As is well-known in the art, the user computer system 150 may further include printing devices for providing hard copy output from the user computer 102, CD-ROM drives for storing information including multimedia information, scanning devices for providing electronic images as input, and manual input devices (e.g., mice, pen systems, etc.) for providing input. The database computer 122 is a multitasking, multiuser computer capable of executing a plurality of processes in parallel. In the preferred embodiment of the present invention, a file server workstation operating the Windows operating environment is used as the database computer 122. However, the present invention may be implemented using a mainframe computer or a plurality of computers connected and operated in parallel for the database computer 122. Similarly, the central rental facility may further comprise printing devices, CD-ROM drives, scanning devices, manual input devices, etc.

In the present invention, a user accesses the central rental facility 180 using the remote user computer system 150 illustrated in FIG. 1. The remote user computer system 150 comprises the elements necessary for accessing the central rental facility 180. The user connects to the central rental facility 180 using communication methods well-known in the art for connecting to other database systems (e.g., Compuserve, etc.). The secure software rental system of the present invention requires that each user be assigned or allocated a unique user identification password. The user identification password is necessary for accessing the central rental facility 180. When electronically connected to the remote user computer system 150 using the modem 106, the central rental facility 180 requests the user to provide the user identification password. The user inputs the user identification password through the keyboard 108 to user computer 102. User computer 102 transmits the user identification password to the central rental facility using modem 106. The database computer 122 of central rental facility 180 receives the user identification password through multiuser modem 126. When the database computer 122 receives the user identification password, the database computer 122, as illustrated in FIG. 2, retrieves the user registration database 212 using electronic connection 260 from system memory/storage 220.

Modules of the Central Rental Facility

Figure 2:
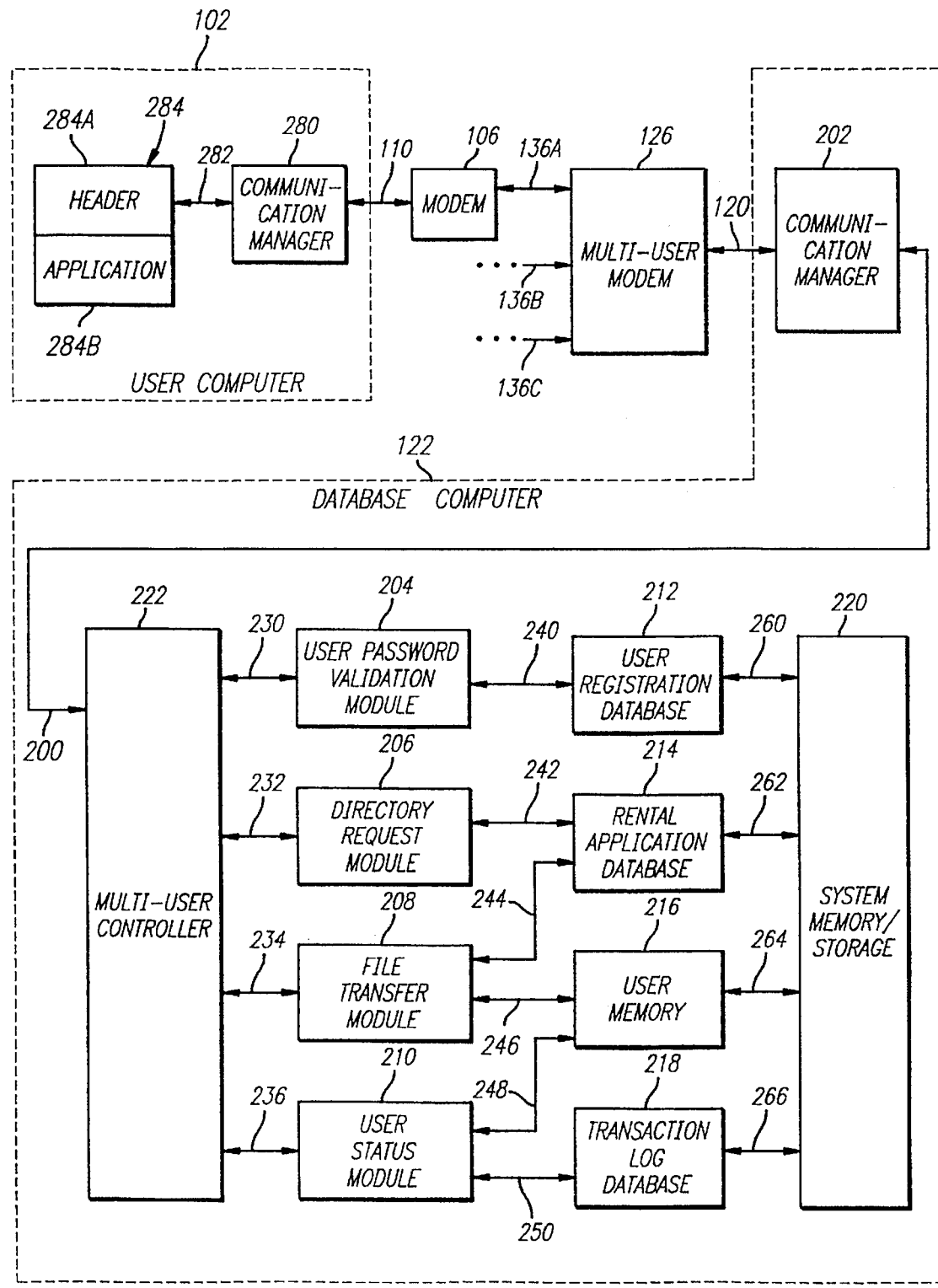
FIG. 2 is a diagram further illustrating the remote user computer system and the central rental facility.

In FIG. 2, the user computer 102 comprises a rental application 284 and communication manager 280. The database computer 122 includes communication manager 202, multiuser controller 222, a plurality of control modules 204–210, databases 212–214, and system memory/storage 220. The user computer 102 is coupled to the database computer 122 through the multiuser modem 126 of the central rental facility 180, as illustrated in FIG. 1. The rental application 284 comprising header 284A and application 284B is coupled to communication manager 280 by software interface module 282. Communication manager 280 is coupled to modem 106 by connection 110. Modem 106 of the remote user computer system 150 is coupled to multiuser modem 126 through communication path 136A.

Multiuser modem 126 is coupled to communication manager 202 by connection 120. Communication manager 202 is coupled to multiuser controller 222 by connection 200. Multiuser controller 222 is coupled to user password validation module 204, director), request module 206, file transfer module 208, and user status module 210 by software interface modules 230, 232, 234, and 236, respectively. The user password validation module is connected to user registration database 212 by coupling 240. The directory request module 206 is connected to the rental application database 214 by coupling 242. The file transfer module 208 is coupled to the rental application database 214 and user memory 216 by coupling 244 and 246, respectively. The user status module 210 is connected to user memory 216 and transaction log database 218 by coupling 248 and 250, respectively. User registration database 212, rental application database 214, user memory 216, and transaction log database 218 to system memory/storage 220 by software interface modules 260, 262, 264, and 266, respectively.

The central rental facility 180 is operated by the multiuser controller 222 that is capable of processing a plurality of users and interfaces with various subsystem elements including multiuser modem 126. Initially, the multiuser controller 222 recognizes that the user has transmitted a user identification password to the central rental facility 180, thereby causing the controller 222 to activate the user registration database 212 through the user password validation module 204. The user registration database 212 contains stored information regarding the identifications of authorized users of the secure software rental system, as well as other relevant information regarding users, in an identifiable file for each user. The user identification password may comprise, up to a predetermined number of characters, any combination of letters of the alphabet and numbers. For example, the Social Security number of the user may be used as the user identification password.

The password validation module 204 performs a check to determine whether or not the transmitted user identification password is authorized by first retrieving and then searching the user registration database 212. When the search fails to locate the user in the user registration database 212, the user password validation module 204 notifies the multiuser controller 222 of the failure. The password validation module 204 transmits the status of the search to controller 222 characterizing the user identification password transfer to the central rental facility 180 as art unauthorized access. The multiuser controller 222 transmits art appropriate message to the remote user computer system 150 that is displayed on its display 104 (shown in FIG. 1), and the central rental facility 180 terminates the connection to the remote user computer system 150.

When the search performed by the password validation module 204 successfully locates the user in the user registration database 212, the user password validation module 204 transmits validity information to the multiuser controller 222. The multiuser controller 222 establishes continuous connection between the central rental facility 180 and the remote user computer system 150 using communication manager 202. This enables the user to directly access the database of the central rental facility 180 (including the rental application database 214) using the remote user computer system 150. The multiuser controller 222 initiates the interface between the remote user computer system 150 and the rental application database 214 by a series of queries from the multiuser controller 222 to the user and by receiving appropriate responses from the user.

The user selects an application software by reviewing the directory of the rental application database 214 using the directory request module 206. In response to an appropriate user command, the multiuser controller 222 transfers the selected application software from the rental application database 214 using the file transfer module. The file transfer module is electronically coupled to the rental application database 214 by connection 244, and it transfers the selected application software from the rental application database through multiuser communication modem 126 to the remote user computer system 150. The multiuser controller 222 transmits the selected application software by means of the communication manager 202 through the multiuser modem 126 across communication path 136A to modem 106 that is controlled by communication manager 280 of the user computer 102.

At the time of the application software transfer to the remote user computer system 150, the multiuser controller 222 registers a transfer time for the application software obtained from the timer clock of the database computer 122. In the preferred embodiment of the present invention, the time of the database computer is measure to a precision of nanoseconds. The transfer time is temporarily stored in the user file of the user registration database 212. The temporarily stored transfer time is kept until the user terminates the communication link between the remote user computer system 150 and the central rental facility 180. If the user transfers another software application from the rental application database 214 to the remote user computer system 150 during the same time period that the user has already transferred an application software from the central rental facility 180, the multiuser controller 222 registers and stores the transfer time of the latter application software. In this manner, during a rental session when the remote user computer system 150 is continuously connected to the central rental facility 180, the multiuser controller 222 maintains a listing of transfer times containing the transfer time of each application software.

In addition to the transfer time of the application software, the multiuser controller transmits a message containing the transfer time of the selected application software and an identification number for the application. The information contained in the message is not displayed to the user. The multiuser controller 222 of the database computer 122 includes encryption and decryption capabilities. Thus, the multiuser controller 222 encrypts the message before transmitting it to the user computer 102.

Once the transfer of an application software to the remote user computer system 150 is completed, the user is able to execute the application software on the user computer 102 of the remote user computer system 150 as though the user is independent of the central rental facility 180. The input and/or output format of the application software is not modified by the present invention. The method of using the software and the input and/or output format of the software are determined by the developer or manufacturer of the application software; therefore, the user executes the software as if the user purchased the software, without any noticeable difference in the operation or interface of the application software. Each application software of the present invention is modified, however, the modification is not apparent to the user.

The application software 284B is modified by integrating it with header software 284A. The combined header and application software is referred to as the rental application software 284, as illustrated in FIG. 2.

Header Software

Figure 3:
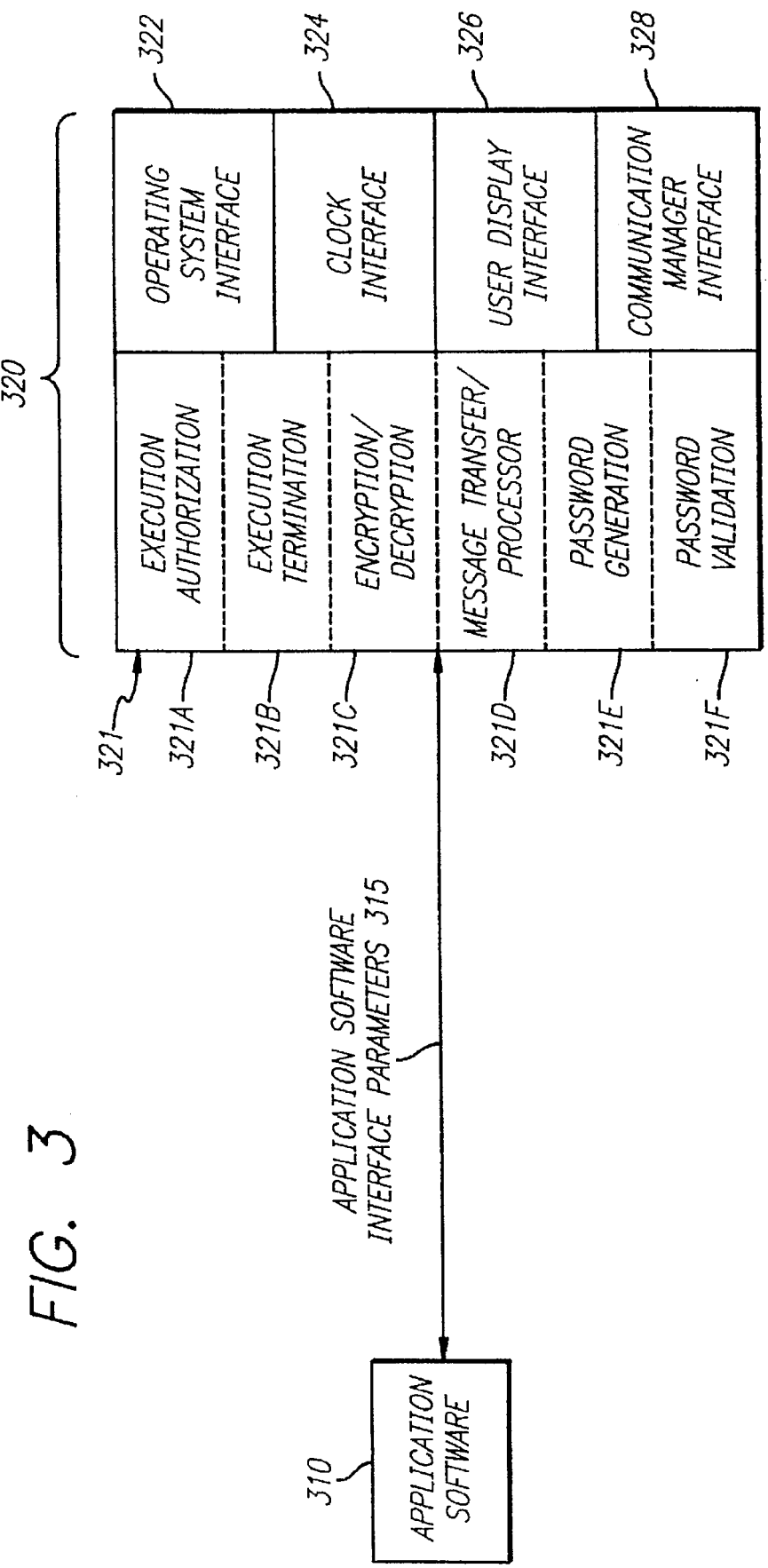
FIG. 3 is a diagram illustrating a rental application comprising an application software and a header according to the present invention.

The internal functions of header software 284A are shown in FIG. 3. In FIG. 3, header software 284A is identified as header 320, and application software 284B is identified as application software 310. Header 320 is coupled to application software 310 by application software interface parameters 315. The header software 320 comprises a rental security manager 321, an operating system interface 322, a clock interface 324, user display interface 326, and communication manager interface 328. The rental security manager comprises several functions or modules: an execution authorization module 321A, an execution termination module 321B, an encryption/decryption module 321C, a message transfer processor 321D, a password generation module 321E, and password validation module 321F.

One function of the header software 320 is to prevent unauthorized use of the application software 310. The rental security manager 321 performs this function. The rental security manager 321 interfaces with the application software 310 through the interface parameters 315. The rental security manager 321 determines whether the user may continue to access the application software 310 using a series of tests. When the user passes the periodic test, the user is authorized to continue executing the application software 310. When the lest fails, the rental security manager 321 terminates execution of the application software 310 and notifies the user of unauthorized rise.

The user operating system interface 322 determines the appropriate interface parameters 315 for executing the application software 310 dependent on the user processor and the operating system (e.g., DOS, Windows, OS/2, etc.).

The clock interface 324 of header 320 obtains the current time, at finite time intervals, from the processor clock of the user computer 102. The time interval is set by the header software 320. In the preferred embodiment of the present invention, a value of 100 ms is used for the time interval. The present invention is not limited to a time interval of 100 ms, and other lithe intervals may be utilized without departing from the scope of the present invention. The user processor clock interface 324 may register the time to a precision level of nanoseconds; however, this depends on the number of bits used to represent the precision of the clock. The user processor clock interface 324 provides the timing information to the rental security manger 321.

The user display interface 326 generates and provides messages (e.g., "Execution is terminated.", etc.) to the user. The header 320 also includes a communication manager interface 328 for controlling the communication modem 106 and interfacing with the multiuser controller 222 of the central rental facility 180.

Overview of the Present Invention

When the user initiates execution of the application software 310, the execution command initiates the application software 310 which in turn initiates the processing of the header software 320. This activates the rental security manger 321 to initiate the process of authorization verification. The authorization verification module 321A obtains the current time from the processor clock of the user computer 102 through the user processor clock interface 324. The time is designated as the local processor clock time, and a sufficient number of digits are used to represent the time to achieve a precision of nanoseconds. The rental security manger 321 also includes encryption/decryption module 321C for encrypting/decrypting authorization verification messages. The multiuser controller 222 and the encryption/decryption module 321C of the rental security manager 321 employ the same encryption/decryption method (DEM). The authorization verification messages are communicated by the message transfer processor 321D between the header software 320 and the multiuser controller 222 of the central rental facility 180.

In response to receiving an authorization verification message, the multiuser controller 222 of the central rental facility 180 decrypts the authorization verification message containing the user processor clock time and the identification number of the application software 310. The time difference between the transfer time and the current processor clock time of the user computer 102 is computed by multiuser controller 222. Using the time difference and the unique user identification password that- is originally given to the user, initial access to the central rental facility 180 is achieved, and a new authorization verification password is generated by the multiuser controller 222 using the password generation module.

The password generation module (of controller 222 and module 321E of rental security manager 321) utilizes a pseudorandom number generation algorithm that is dependent on two parameters: the time difference and the user identification password. The password generation module is flexible so that a large number of pseudorandom values may be generated by proper selection of variables. Moreover, the number of characters associated with the pseudorandom number parameters may be preset by proper selection of the algorithm variables as well. The password generation algorithm is deterministic, and therefore a unique, pseudorandom number exists for a specific time difference and user identification password. If either the time difference or the user identification password is changed in any manner, the password generation module generates a resulting pseudorandom value that is significantly different from the previous one. The password generation module guarantees a varying, unique, pseudorandom number for the user that is used as the password for continuous authorization verification. The password can not be reproduced unless the exact user processor clock time (accurate to the nanosecond level of precision), the exact transfer time, the user identification password, and the deterministic algorithm are known.

The pseudorandom number generation algorithm is kept confidential from the user. The user cannot derive the algorithm front the executable element of the integrated application software 310 and the header software 320 because the source code of the rental application 284 is not available to the user. Further, the password generation module (of controller 222 and module 321E of rental security manager 321) utilizing the algorithm operates without the user's knowledge, and information regarding password generation is not provided to the user until the authorization verification fails. When authorization verification fails, the user is notified that the application software is terminating and is advised to verify the communication link.

Once the password generation module 321E generates the new authorization verification password, the rental security manager 321 stores the password temporarily as a function of the processor clock time. The message transfer processor 321D of the rental security manager 321 prepares a message containing the user processor clock time, the user identification password, and the identification number of the application software 310 that is to be transmitted to the multiuser controller 222 at the central facility 180. Prior to transmission, the encryption/decryption module 321C encrypts the message. The encrypted message is transmitted to the multiuser controller 222 of the central facility 180 through the communication manager interface 328. Encrypting the message provides added protection in case the message communicated between the remote user computer system 150 and the central rental facility 180 is tapped.

Multiuser controller 222 receives the encrypted message containing the processor clock time, the user identification password, and the identification number of the application software 310 via multiuser communication modem 126, and decrypts the message using the DEM algorithm. The message does not contain the authorization verification password generated by the pseudorandom number password generation module 321E of the header software 320. The multiuser controller 222 computes the time difference between the user processor clock time and the transfer time of the application software 310 that was stored temporarily in the user file of the user registration database 212. The multiuser controller 222 generates a pseudorandom number parameter using the deterministic algorithm dependent on the time difference and the user identification password. Because the multiuser controller 222 and the password generation module 321E of the rental security manager 321 use the same encryption/decryption algorithm, the multiuser controller 222 generates a pseudorandom number parameter that is identical to the one generated by the rental security manager 321 using identical input parameters.

Once the multiuser controller 222 generates a pseudorandom number parameter, it creates a new message containing the processor clock time, the user identification password, and the pseudorandom number parameter. The multiuser controller 222 encrypts the message using the DEM algorithm, and transmits the message back to the user. The multiuser controller 222 does not use the clock time of the database computer 122 to accomplish this. Any time difference between the user processor clock of the user computer 102 and the clock of the central rental facility 180 is irrelevant to this process. Therefore, the authorization verification process is dependent on the user processor clock time for computing the time difference frown the transfer time. The user processor clock time of the user computer 102 may err from true time known to the central rental facility 180 or any other clock. The authorization verification process is therefore independent of the accuracy of the user processor clock time. The multiuser controller 222 computes the time difference using the user processor clock time to distinguish the authorization verification password from other passwords.

The rental security manager 321 receives the encrypted message containing the user processor clock time, the user identification password, and the pseudorandom number parameter generated by multiuser controller 222. The encryption/decryption module 321C of the rental security manager 321 (utilizing the DEM algorithm) decrypts the received message. The password validation module 321F compares the message using a password correlation algorithm against the stored information regarding the user processor clock time, the user identification password, and the authorization verification password. The correlation process of the password validation module 321F compares the received message and the stored message on a bit-by-bit basis. When the correlation function is successfully completed, the current authorization verification process is completed, and the header 320 allows the application software to continue executing. The entire authorization verification process is performed without the knowledge of the user.

When the password validation module 321F (using the password correlation function) detects a discrepancy between the received message and the stored message, the password correlation fails causing the authorization verification process to fail. In response to the password correlation failure, the execution termination module 321B initiates termination of the executing application software 310; however, the application software 310 is not terminated based on a single authorization verification failure. Generally, the rental security manager 321 does not terminate execution of application software 310 until three consecutive failures of authorization verification occur. This prevents erroneous authorization verification failure caused by the header software 320 or the central rental facility 180 or both including bit errors introduced during communication or by either the encryption or decryption process. If three failures do occur, the execution termination module 321B also notifies the user (through the user display interface 326) that the user has attempted to execute the application software 310 without proper authorization.

After successfully completing the first authorization verification process, the rental security manager 321 sequences the authorization verification process to occur at finite time intervals throughout the execution of the application software 310. When authorization verification is continuously successful during this period, the user does not have knowledge of this process, and it does not impact the execution and use of the application software 310.

Flow Diagrams Illustrating the Present Invention

Figure 11:
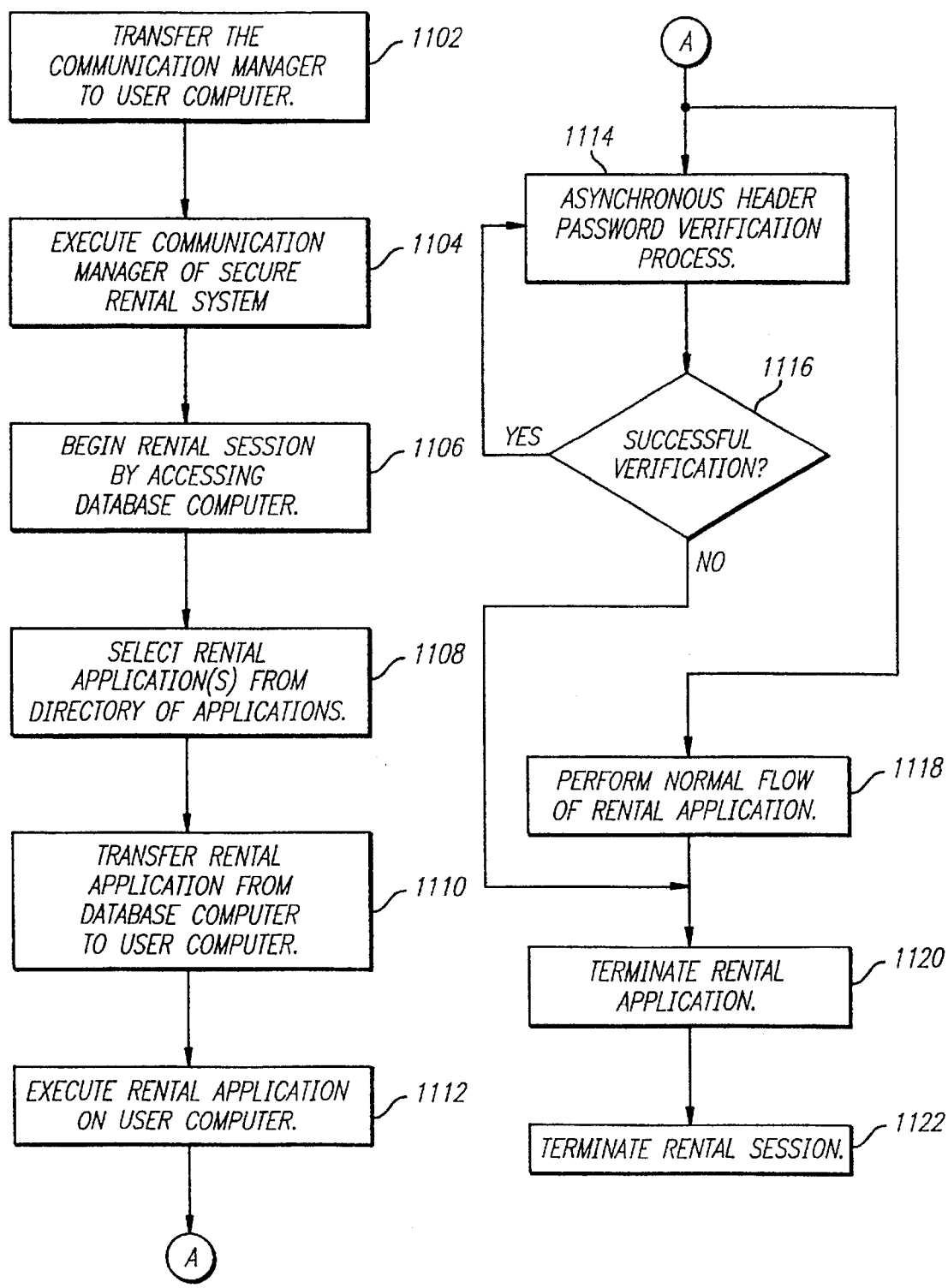

FIG. 11 is a flow diagram illustrating the present invention for providing secure software rental. In step 1102, the communication manager 280 is transferred from the database computer 122 (alternatively referred to as the central rental facility 180) to the user computer 102. In step 1104, the communication manager 280 is executed using the user computer 102. In step 1106, the user computer 102 accesses the database computer 122 to begin a rental session. In step 1108, a rental application is selected from a rental application database 214 contained in the database computer 122. The user browses the rental application database 214 on the database computer 122 using the directory request module, and selects one or more rental applications. In step 1110, the selected rental application is transferred from the database computer 122 to the user computer 102. In step 1112, the rental application is executed on the user computer 102. In step 1118, the normal flow of the rental application is executed. Execution continues toward step 1120.

In step 1114, an asynchronous header password verification process is executed in parallel with the normal flow of rental application of step 1118. This process ensures that continuous communication is maintained between the user computer 102 and the database computer 122. In decision block 1116, a check is made to determine if the password verification is successful. When decision block 1116 returns true (yes), execution continues at step 1114. When decision block 1116 returns false (no), execution continues toward step 1120. In step 1120, the rental application is terminated. In step 1122, the rental session is terminated.

FIG. 8 is a flow diagram illustrating step 1102 of FIG. 11 for transferring the communication manager 280 to the user computer 102 from the database computer 122. Step 1102 is normally performed once. Subsequent execution of the steps illustrated in FIG. 11 is performed without step 1102. In step 802 of FIG. 8, any communication software that supports communication over telephone transmission lines is executed using the user computer 102. The communication software may be any off-the-shelf communication application. In step 804, the user computer 102 accesses the database computer 122 using the communication software. In step 806, a communication manager of the Secure Rental System is copied from the database computer 122 to the user computer 102. In step 808, the user computer 102 is disconnected from the database computer 122.

Flow Diagram Illustrating Asynchronous Password Verification

Figure 9:
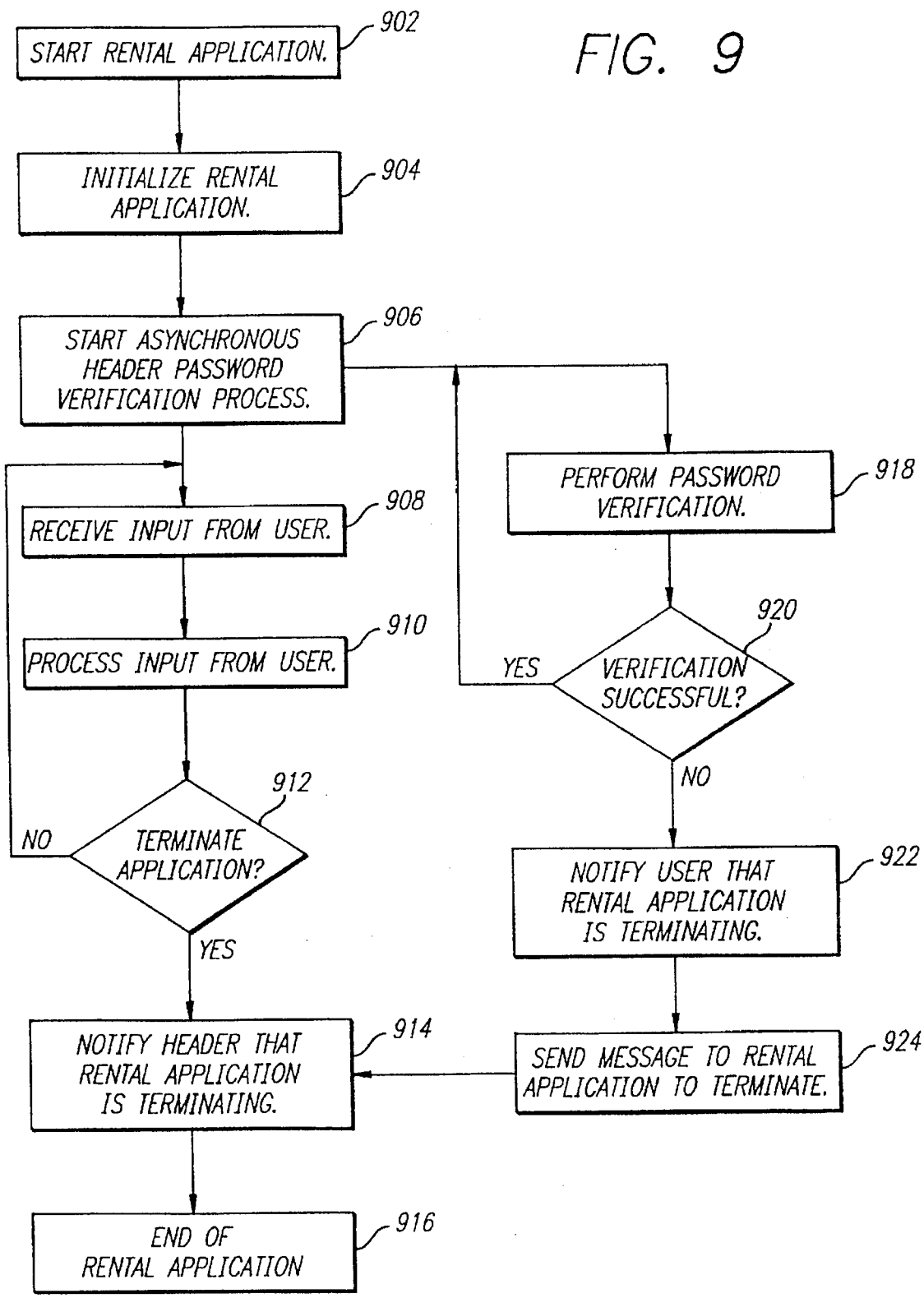
FIG. 9 is a flow diagram illustrating the step 1118 of FIG. 11 of the present invention.

FIG. 9 is a flow diagram illustrating the step 1118 of FIG. 11 for performing the normal flow of the rental application. In step 902, the rental application starts executing. In step 904, the rental application is initialized. In step 906, the asynchronous header password verification process is started using the application software interface parameters 315. The asynchronous header password verification process operates in parallel with the process including steps 908 and 912. In the normal flow process, execution continues at step 908. In step 908, the rental application receives input from the user. In step 910, the input received from the user is processed. Execution continues at decision block 912.

In the asynchronous header password verification process, execution continues at step 918. In step 918, the password verification process is performed. In decision block 920, a check is made to determine if the verification is successful. When decision block 920 returns true (yes), execution continues at step 918. When decision block 920 returns false (no), execution continues at step 922. In step 922, the user is notified that the rental application is terminating. In step 924, a message is sent to the rental application for it to terminate. Execution continues toward block 914.

In decision block 912, a check is made to determine if the rental application should terminate. When decision block 912 returns false (no), execution continues at step 908. When decision block 912 returns true (yes), execution continues at step 914. Thus, decision block 912 returns true (yes) when either the rental application terminates normally, or the password verification process is not successful and sends a terminate message to the normal flow process. In step 914, the header is notified that the rental application is terminating. In step 916, the rental application is terminated.

Asynchronous Header Password Verification Process

FIGS. 10A–10D are flow diagrams illustrating the asynchronous header password verification process of the present invention. In step 1002, the password verification process is started. In step 1004, the header software 320 establishes program-to-program communications with communication manager 280 of the user computer 102. In decision block 1006, a check is made to determine if communication is established between the header software 320 and the communication manager 280. When decision block 1006 returns false (no), execution continues at step 1016. In step 1016, the user is notified that communication with the database computer 122 is not established. In step 1018, a message is sent to the rental application for it to terminate. In step 1020, the header 320 terminates.

When decision block 1006 returns true (yes), execution continues at step 1008. In step 1008, a rental application transfer time request is created using a user identifier and a rental application identifier (alternatively referred to as the application identifier). In step 1010, the rental application transfer time request is encrypted. In step 1012, the rental application transfer time request is sent to the database computer 122 using the communication manager 280. In decision block 1014, a check is made to determine if thirty seconds has elapsed since the rental application transfer time request was sent to the database computer 122. When decision block 1014 returns false (no), execution continues at decision block 1014. When decision block 1014 returns true (yes), execution continues at step 1022 of FIG. 10B.

Figure 10A:
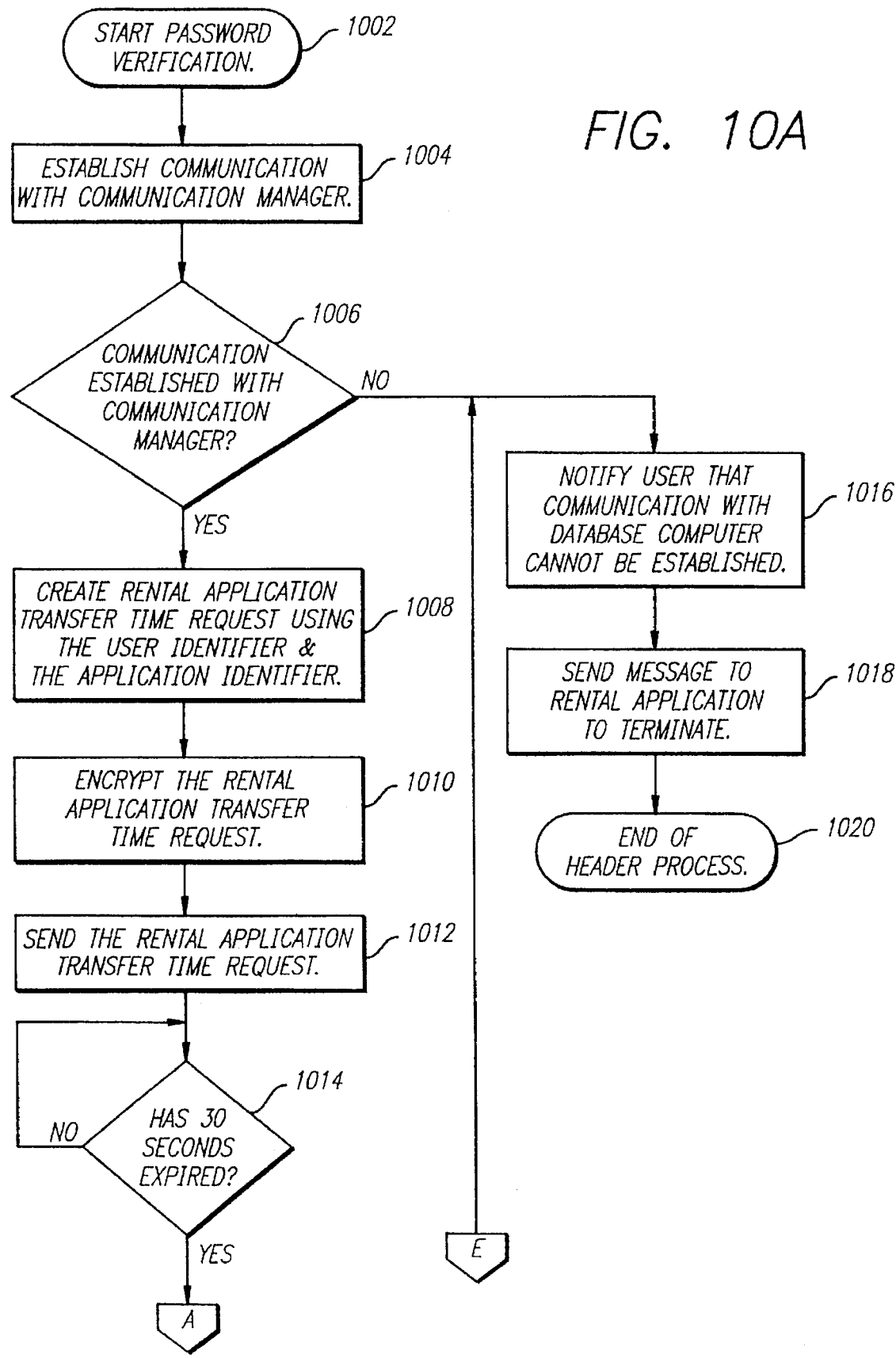
FIGS. 10A-10D are flow diagrams illustrating the asynchronous header password verification process of the present invention; and, FIG. 11A is a flow diagram illustrating the present invention for providing a secure software rental system.
Figure 10B:
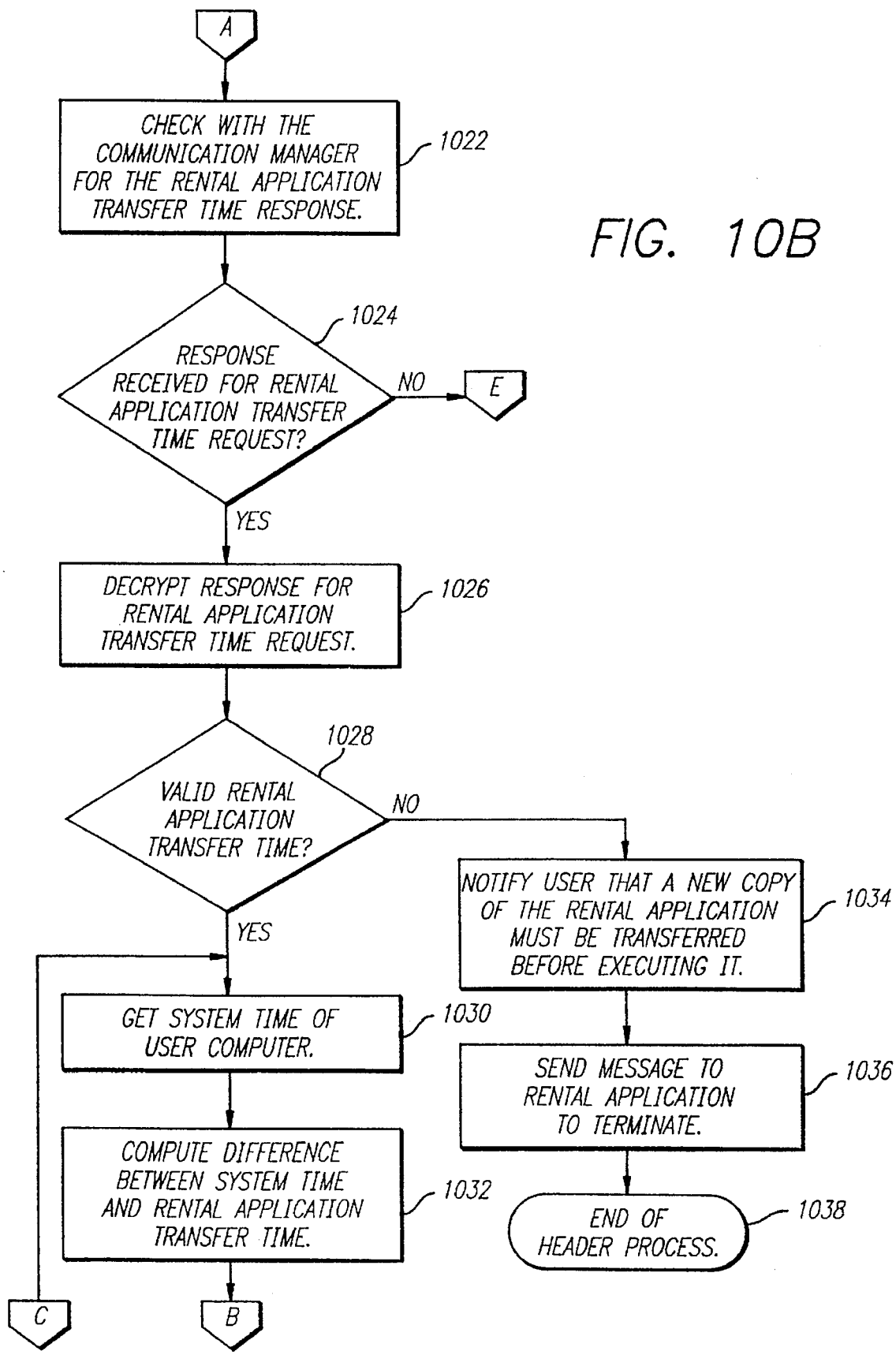

In step 1022 shown in FIG. 10B, the communication manager is checked for the rental application transfer time request. In decision block 1024, a check is made to determine if a response was received for the rental application transfer time request. When decision block 1024 returns false (no), execution continues at step 1016 of FIG. 10A notifying the user that communication with the database computer 122 is not established. When decision block 1024 returns true (yes), execution continues at step 1026. In step 1026, the response for the rental application transfer time request is decrypted.

In decision block 1028, a check is made to determine if the rental application transfer time is valid. When decision block returns false (no), execution continues at step 1034. In step 1034, the user is notified that a new copy of the rental application must be transferred from the database computer 122 to the user computer 102 before it can be executed. In step 1036, a message is sent to the rental application for it to terminate. In step 1038, the header 320 is terminated. When decision block 1028 returns true (yes), execution continues at step 1030. In step 1030, the system time of the user computer 102 is obtained. In step 1032, the difference between the system time of the user computer 102 and the rental application transfer time are computed. Execution continues at step 1040 of FIG. 10C.

Figure 10C:
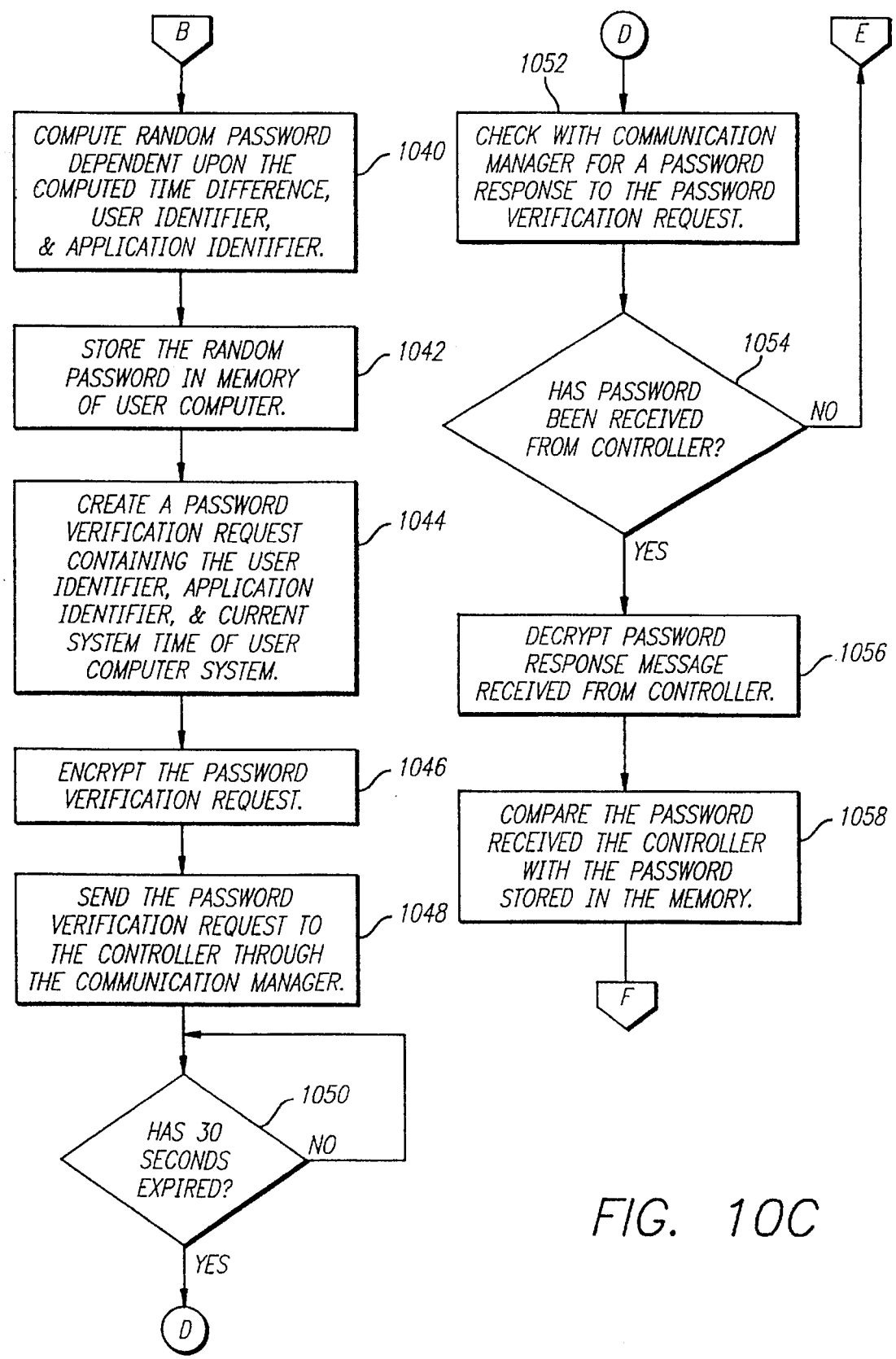
Figure 10D:
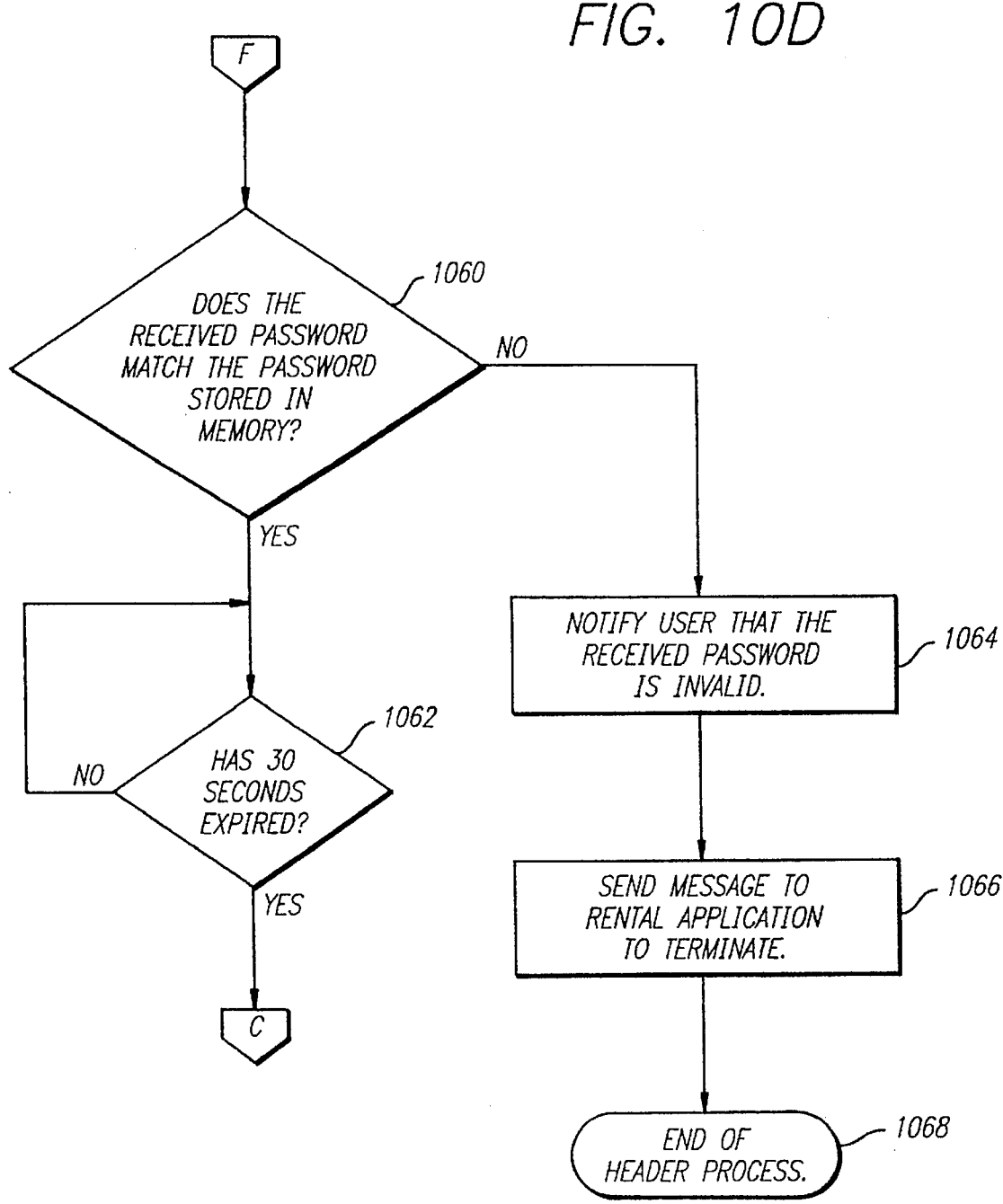

In step 1040 shown in FIG. 10C, a random password is computed dependent upon the computed time difference, the user identifier, and the application identifier. In step 1042, the random password is stored in memory of the user computer 102. In step 1044, a password verification request is created containing the user identifier, the application identifier, and the current system time of the user computer system. In step 1046, the password verification request is encrypted. In step 1048, the password verification request is sent to the controller 222 of the database computer 122 through the communication manager. In step 1050, a check is made to determine if thirty seconds has elapsed since the password verification request was sent to the multiuser controller 222. When decision block 1050 returns false (no), execution continues al decision block 1050. When decision block 1050 returns true (yes), execution continues at step 1052.

In step 1052, the communication manager is checked for a password response to the password verification request. In decision block 1054, a check is made to determine whether a password has been received from the multiuser controller 222. When decision block 1054 returns false (no), execution continues at step 1016 shown in FIG. 10A. When decision block 1054 returns true (yes), execution continues at step 1056. In step 1056, the password response message from the multiuser controller 222 is decrypted. The decrypted password received from the multiuser controller 222 is compared with the password stored in the memory of file user computer 102. Execution continues at step 1060 of FIG. 10D.

In decision block 1060, a check is made to determine if the received password matches the password stored in the memory. When decision block 1060 returns false (no), execution continues at step 1064 In step 1064, the user is notified that the received password is invalid. In step 1066, a message is sent to the rental application for it to terminate. In step 1068, the header 320 terminates. When decision block 1060 returns true (yes), execution continues at decision block 1062. In decision block 1062, a check is made to determine if thirty seconds has elapsed. When decision block 1062 returns false (no), execution continues at decision block 1062. When decision block 1062 returns true (yes), execution continues at step 1030 shown in FIG. 10B.

There are, however, at least three ways that a user may attempt to circumvent the rental scheme. In the first method, the user disconnects the communication link while the application software 310 is being executed. This event is detected by the header software 320 because the dynamic password authorization procedure fails due to the lack of a communications link. In the second method, the user attempts to execute a previously transferred and stored application software 310 without having a communication link to the central rental facility 180. This event is detected by the header software 320 producing a failure because a communication link does not exist. In the third method, the user attempts to execute a previously stored application software using an established communication link with the central rental facility 180. This event is detected by the header software 320 producing a failure because a valid transfer time does not exist. The three methods are disclosed in detail below.

Disconnecting Communication Link While Executing Application Software

In the first manner of attempting to circumvent the software rental system, after transferring the executable element of the application software 310 to the user computer 102 and initiating execution of the application software 310, the user disconnects the communication link between the remote user computer system 150 and the central rental facility 180. FIG. 9 is a flow diagram illustrating step 1118 of FIG. 11 for performing the normal flow of the rental application prior to the user disconnecting the communication link with the central rental facility 180. FIGS. 10A–10D are flow diagrams illustrating the asynchronous password verification process under normal operation. If the communication link is disconnected after initiating execution of the application software 310, communication failure is located in one of two places in the asynchronous password verification process.

The first failure begins at step 1012 of FIG. 10A. In step 1012, the rental application transfer time request is sent to the database computer 122 using the communication manager 280 of the user computer 102. In decision block 1014, a check is made to determine if thirty seconds has elapsed since the rental application transfer time request was sent to the database computer 122. When decision block 1014 returns false (no), execution continues at decision block 1014. When decision block 1014 returns true (yes), execution continues at step 1022 of FIG. 10B. In step 1022, the communication manager 280 is checked for the rental application transfer time request. In decision block 1024, a check is made to determine if a response was received for the rental application transfer time request. A rental application transfer request is not obtained because the communication link was disconnected after execution of the application software 310 was initiated. Decision block 1024 returns false (no) and execution continues at step 1016 of FIG. 10A. In step 1016, the user is notified that communication with the database computer 122 is not established. A message is sent to terminate the rental application in step 1018 and the header 320 terminates in step 1020.

The second failure begins at step 1048 of FIG. 10C. In step 1048, the password verification request is sent to the multiuser controller 222 of the database computer 122 through the communication manager 280. In decision block 1050, a check is made to determine if thirty seconds has elapsed since the password verification request was sent to the multiuser controller 222. When decision block 1050 returns false (no), execution continues at decision block 1050. When decision block 1050 returns true (yes), execution continues at step 1052. In step 1052, the communication manager 280 is checked for a password response to the password verification request. In decision block 1054, a check is made to determine if a password has been received from the multiuser controller 222. A password response is not obtained because the communication link was disconnected after execution of the application software 310 was initialed. Decision block 1024 returns false (no) and execution continues at step 1016 of FIG. 10A. In step 1016, the user is notified that communication with the database computer 122 is not established. A message is sent to terminate the rental application in step 1018 and the header 320 terminates in step 1020.

Execute Rental Application Using Stored Application Software Without Connecting to the Central Rental Facility In the second manner of attempting to circumvent the software rental system, the user copies the executable element of the application software 310 to a storage device (e.g., a hard disc or a floppy disc) of the user computer 102. The user subsequently loads the executable element of the application software 310 from the storage device and attempts to execute it using the user computer 102 without a communication link established between the user computer 102 and the central rental facility 180.

Figure 4:
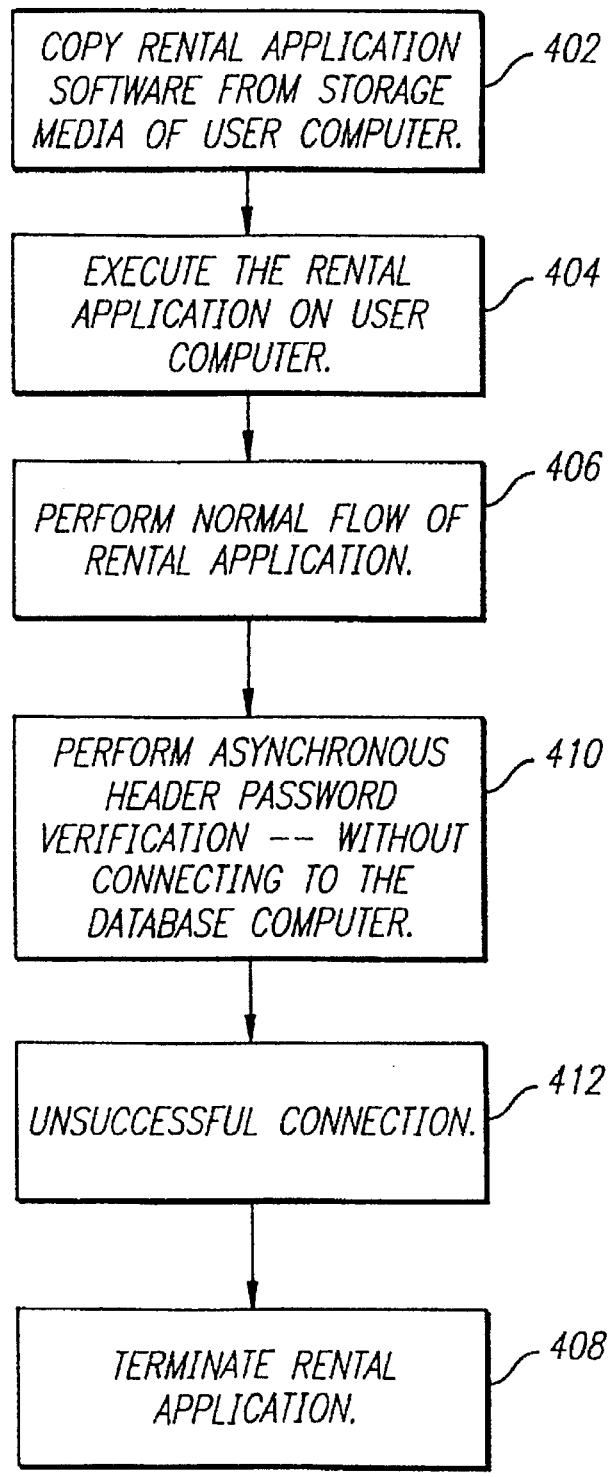
FIG. 4 is a flow diagram illustrating the present invention for preventing execution of a rental application stored in the user computer and the user computer is not connected to the central rental facility.
Figure 5:
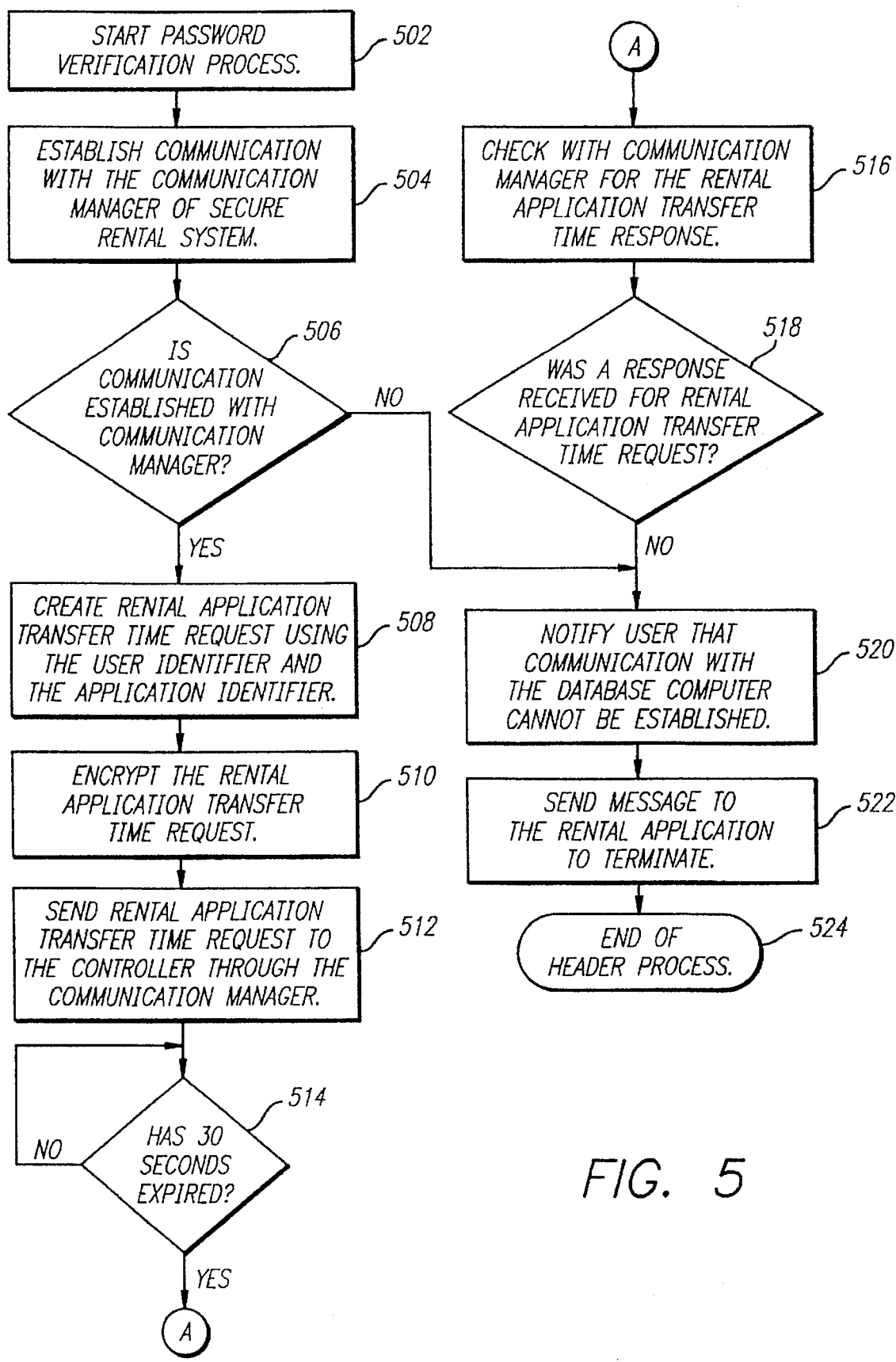
FIG. 5 is a flow diagram further illustrating FIG. 4.

Since the application software 310 is available in the user computer 102, the user may attempt to execute it. Attempting to execute the application software 310 immediately triggers the header software 320 that is integrated with it, thereby activating the rental security manager 321. In turn, the rental security manager 321 initiates the authorization verification process. In the authorization verification process, an encrypted message containing the user processor clock time, the user identification password, and the identification number for the application software 310 is communicated to the multiuser controller 222 of the central rental facility 180. When the rental security manager 321 attempts to initiate communications using the communication manager interface 328, it however detects an error because the communication link with the central rental facility 180 is disconnected. Once the error is detected, the rental security manager 321 determines that an unauthorized attempt to execute the application software 310 occurred, and it terminates the application software 310. An appropriate message is displayed to the user through the user display interface 326. FIGS. 4 and 5 illustrate the present invention in detail for this case.

FIG. 4 is a flow diagram illustrating the present invention when a rental application that is stored on the storage media of the user computer 102 is executed without connecting to the database computer 122. In step 402, a rental application is copied from a storage media of the user computer 102 to the memory of the user computer 102 without connecting to the database computer 122. In step 404, the rental application is executed on the user computer 102. In step 406, the normal flow of the rental application is performed as disclosed in FIG. 2. Execution continues toward step 408. In step 410, in parallel with the normal flow of the rental application of step 406, the asynchronous header password verification process is performed without connecting to the database computer 122. In step 412, a message for an unsuccessful connection is sent to the rental application. Execution continues toward step 408. In step 408, the rental application is terminated.

FIG. 5 is a flow diagram illustrating step 410 of FIG. 4 for performing the asynchronous header password verification without connecting to the database computer 122. In step 502, the password verification process starts. In step 504, communication is established between the header software 320 and the communication manager 280 of the user computer 102. In step 506, a check is made to determine if communication is established between the header software 320 and the communication manager 280 of the user computer 102. When decision block 506 returns false (no), execution continues at step 520. When decision block 506 returns true (yes), execution continues at step 508. In step 508, a rental application transfer time request is created using the user identifier and the application identifier.

In step 510, the rental application transfer time request is encrypted. In step 512, the rental application transfer time request is sent to the multiuser controller 222 through the communication manager. In decision block 514, a check is made to determine if 30 seconds has expired. When decision block 514 returns false (no), execution continues at decision block 514. When decision block 514 returns true (yes), execution continues at step 516. In step 516, the communication manager is checked for the rental application transfer time response. In decision block 518, a check is made to determine if a response was received for the rental application transfer time request. Decision block 518 returns false (no) because the user computer 102 is not connected to the database computer 122, execution continues at step 520. In step 520, the user is notified that communication with the database computer 122 is not established. In step 522, a message is sent to the rental application for it to terminate. In step 524, the header terminates.

Since the user computer 102 is connected to the central rental facility, 180 via the communication link, the rental security manager 321 transmits the encrypted transfer time request message (containing the user identification password and the identification number of the application software) to the multiuser controller 222 of the central rental facility 180. After the message is received by the multiuser controller 222, it decrypts the message and tries to retrieve the transfer time associated with the application software 310 that is represented by an identification number. As stated previously, the transfer time of a particular application software 310 is stored temporarily in the user file in the central rental facility 180 during the time period when the user computer 102 is connected to the central rental facility 180 by a communication link and the user transfers then application software 310 to the user computer 102 from the rental application database 262. The multiuser controller 222 uses the file transfer module 208 to transfer the application software 310.

Execute Stored Rental Application—Connected to the Central Facility Without Transferring Rental Application The third method of attempting to circumvent the present invention involves the user establishing a communication link between user computer 102 and the central rental facility 180. Instead of currently transferring the application software 310 from the rental application database 214 of the central rental facility 180, the user loads an executable element of the application software 310 into the user computer 102 from a copy of the application software 310 previously stored in a storage device of the user computer 102.

Figure 6:
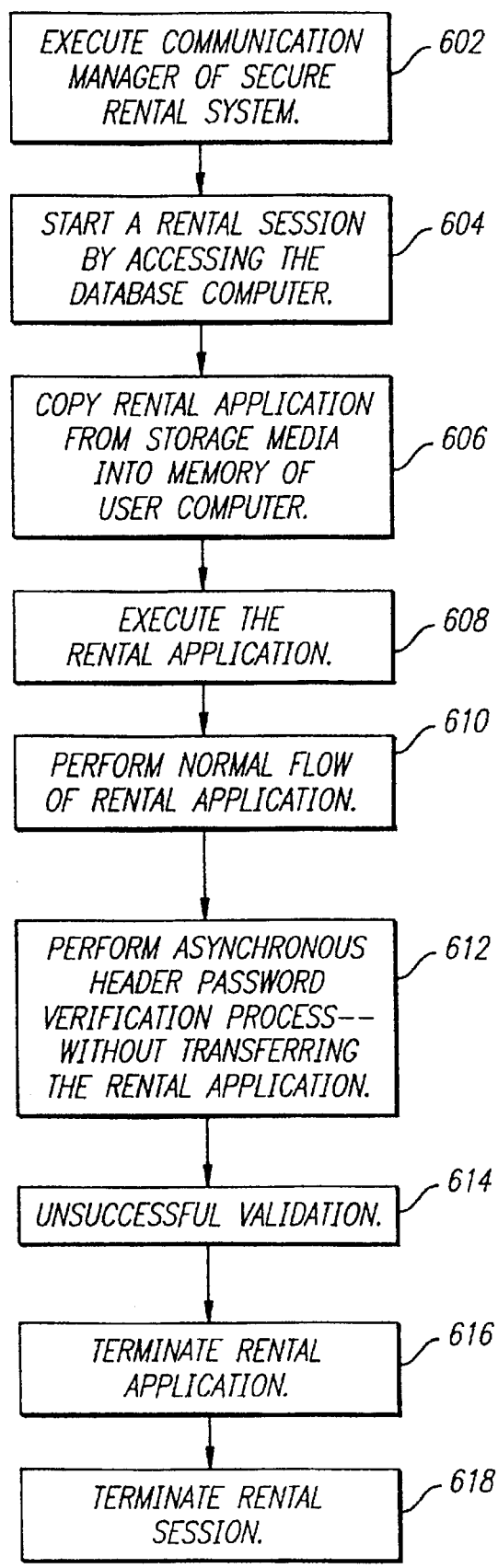
FIG. 6 is a flow diagram illustrating the present invention when a rental application stored on the storage media of the user computer is executed after connecting to the database computer without transferring the rental application from the database computer.
Figure 7A:
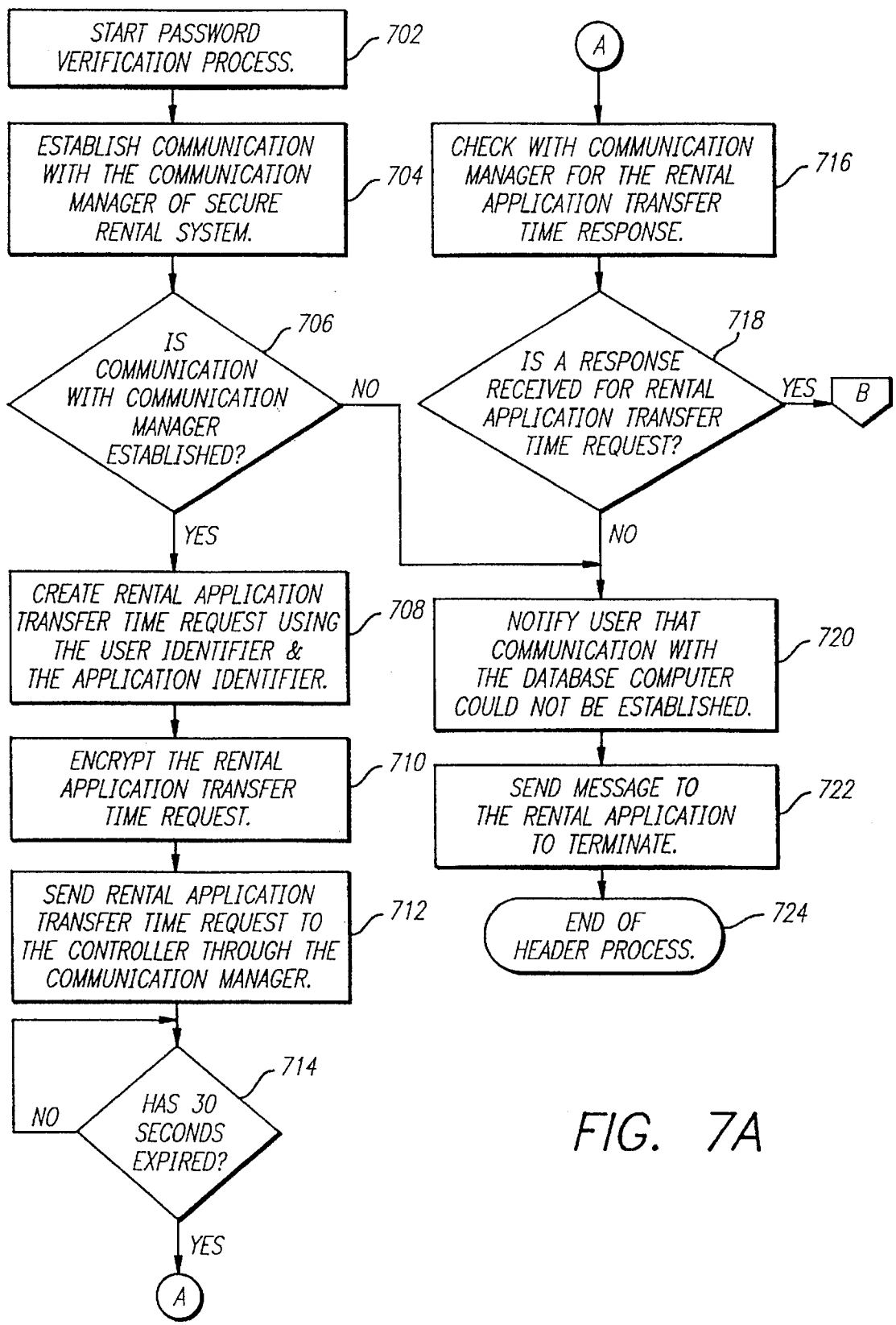

The information including the application software transfer time is erased from storage of the central rental facility 180 when the communication session with the user is terminated. If the user computer 102 subsequently reestablishes a communication link with the central rental facility 180, the transfer time of the application software 310 transferred in a prior session is not available at the central rental facility 180. Therefore, when the multiuser controller 222 tries to retrieve the transfer time from the user file, it fails to locate the information. This triggers an error condition, and the error condition is communicated to the rental security manager 321. The rental security manager 321 determines that an unauthorized attempt to execute the application software has been made and terminates the application software 310. An appropriate message is displayed to the user through the user display interface 326. FIGS. 6, 7A and 7B illustrate the present invention in detail for this case.

FIG. 6 is a flow diagram illustrating the present invention when a rental application that is stored on the storage media of the user computer 102 is executed after connecting to the database computer 122 without, however, transferring the rental application from the database computer 122. In step 602; the communication manager of the present invention is executed. In step 604, a rental session is started by accessing the database computer 122. In step 606, the rental application is copied from the storage media of the user computer 102 into the memory of the user computer 102. In step 608, the rental application is executed. In step 610, the normal flow of the rental application is performed. Execution continues at step 616. In step 612, in parallel with the normal flow process of step 610, the asynchronous header password verification process is performed without transferring the rental application. In step 614, a message for an unsuccessful connection is sent to the rental application. Execution continues toward step 616. In step 616, the rental application is terminated. In step 618, the rental session is terminated.

FIGS. 7A–7B are flow diagrams illustrating step 612 of FIG. 6 for performing the asynchronous header password verification process after connecting to the database computer 122 without, however, transferring the rental application from the database computer 122. In step 702, the password verification process is started. In step 704, communication is established between the user and database computers using the communication manager of the present invention. In decision 706, a check is made to determine if communication is established using the communication manager. When decision block 706 returns false (no), execution continues at step 720. When decision block 706 returns true (yes), execution continues at step 708.

In step 708, a rental application transfer time request is created using the user identifier and the application identifier. In step 710, the rental application transfer time request is encrypted. In step 712, the rental application transfer time request is sent to the multiuser controller 222 through the communication manager. In decision block 714, a check is made to determine if thirty seconds has expired. When decision block 714 returns false (no), execution continues at decision block 714. When decision block 714 returns true (yes), execution continues at step 716. In step 716, the communication manager is checked for rental application transfer time response. In decision block 718, a check is made to determine if a response is received for the rental application transfer time request. When decision block 718 returns false (no), execution continues at step 720. In step 720, the user is notified that communication with the database computer 122 could not be established. In step 722, a message is sent to the rental application for it to terminate. In step 724, the header is terminated. When decision block 718 returns true (yes), execution continues at step 726 of FIG. 7B.

In step 726 shown in FIG. 7B, the response for the rental application transfer time request is decrypted. In decision block 728, a check is made to determine if the rental application transfer time is valid. When decision block 728 returns false (no), execution continues at step 730. In step 730, the user is notified that a new copy of the rental application must be transferred to the user computer 102 before the rental application can be executed. In step 732, a message is sent to the rental application for it to terminate. In step 734, the header 320 is terminated.

Multiple Users and Applications

The present invention requires the user to transfer the application software 310 from the rental application database 214 to user computer 102 in each communication session between the remote user computer system 150 and the central rental facility 180 for the user to execute the application software 310. The present invention enables the central rental facility 180 to monitor the time period when a particular application software 310 is executed by a user. Since the multiuser controller 222 continuously interfaces and interacts with the rental security manager 321 during execution of the application software 310, the multiuser controller 222 is able to monitor and record the pertinent information regarding the execution in the user file for billing and accounting purposes.

Further, the multiuser controller 222 is able to transfer, interface, and monitor more than one application software 310 concurrently with regard to a user. Thus, the user may transfer more than one application software 310 from the rental application database 214 and execute each one during a single communication session between the user computer 102 and the Central rental facility 180.

In addition, the multiuser controller 222 is capable of interfacing with a number of users concurrently. However, each user is handled separately and no other user has access to any information of any other user. The multiuser controller 222 operates by interfacing with user password validation module 204, directory request module 206, file transfer module 208, and user status module 210. The user password validation module 204 interfaces with user registration database 214 through electronic interface 240. Directory request module 206 interfaces with rental application database 214 through electronic interface 242. File transfer module 208 interfaces both rental application database 214 and user memory 216 through electronic interfaces 244 and 246. User status module 210 interfaces the connected user status in memory 216 through electronic interface 248 and also interfaces transaction log database 218 through electronic interface 250.

The memory/storage unit 220 of central rental facility 180 stores all relevant information for operating the central rental facility 180 and can be updated as needed using on-line executive and management software in the database computer 122 of the central rental facility 180. The management function includes monitoring and administrating operations of central rental facility 180. Further, the management software is capable of providing periodic status information of the operations of the central rental facility 180 to the operator.

Thus, the present invention provides a system for securely renting application software to users connected to the database computer 122. It prevents unauthorized copying and usage of the application software. The system provides a unique security method that is specific to each user for preventing circumvention of the system by the user and persons other than the user, thereby preventing other persons from using the application software. The present invention implements a general security scheme that is independent of any specific application software. The system allows the user to access application software without being made aware that the security system is continuously processing during execution of the application software.

The present invention modifies application software by integrating header software with application software. The combined header and application software are the rental application software. The header software is an integral element of the secure rental software system. The header software operates transparently so that the user provides normal input/output operations to the application software without change. When an unauthorized usage of the application software occurs, a message notifies the user that the application software is terminating, and the application software terminates.

In this manner, a method and apparatus for providing a secure software rental system is disclosed.

I claim:

1. A method for securely executing software, comprising the steps of:

establishing a communication between a first computer and a second computer;

selecting at least one application software from a plurality of application software stored in said second computer;

transferring said at least one application software from said second computer to said first computer;

executing said at least one application software on said first computer;

said at least one application software initiating an asynchronous header;

checking a first password generated by said first computer using said asynchronous header;

said asynchronous header maintaining said communication continuous when said first password is verified;

said asynchronous header repeating said checking step until said first password is not verified;

said asynchronous header terminating said communication and said at least one application software when said first password is not verified.

2. The method of claim 1 wherein said communication is established using a first modem coupled to said first computer and a second modem coupled to said second computer.

3. The method of claim 1 further comprising the step of recording a transfer time in said second computer for said at least one application software when said at least one application software is transferred, wherein said transfer time is used by said first computer to generate said first password.

4. The method of claim 3 wherein said transfer time is transmitted from said second computer to said first computer.

5. The method of claim 4 wherein an application identification number for said at least one application software is transmitted to said second computer, wherein said application identification number is used by said second computer to generate a second password.

6. The method of claim 1 wherein said step of establishing said communication between said first computer and said second computer comprises the steps of:

executing a communication manager on said first computer; and said first computer accessing said second computer using said communication manager to transfer said at least one application software from said second computer to said first computer.

7. The method of claim 6 wherein said step of initiating said asynchronous header comprises the steps of:

generating by said first computer a transfer time request;

transmitting, by said application software being executed on said first computer, said transfer time request comprising a user identifier and an application identifier of said application software to said second computer;

checking said communication manager using said asynchronous header for a transfer time response from said second computer when a first time interval elapses; and said asynchronous header receiving said transfer time response from said communication manager when said second computer transmits said transfer time response.

8. The method of claim 7 wherein said step of verifying said first password using said asynchronous header comprises the steps of:

(a) obtaining a current time of said first computer using said asynchronous header;

(b) computing said first password dependent on a time difference between said current time of said first computer and said transfer time and storing said first password in said first computer; and (c) transmitting a password verification request comprising said current time to said second computer;

(d) said asynchronous header checking said communication manager for a password response when a second time interval elapses;

(e) receiving said password response comprising a second password from said second computer when said second time interval elapses;

(f) comparing said second password from said second computer and said first password of said first computer using said asynchronous header; and (g) said asynchronous header terminating said rental application when said second password does not match said first password, said asynchronous header allowing a third time interval to elapse and repeating steps (a)–(g) when said second password matches said first password.

9. A method of providing secure application software, the method comprising the steps of:

initiating a rental session by accessing a central rental facility using a communication manager, said communication manager executing on a user computer;

selecting a rental application from a plurality of rental applications stored in said central rental facility, said rental application comprising an application software and an asynchronous header;

transferring said selected rental application from said central rental facility to said user computer;

executing said rental application on said user computer;

said execution of said rental application causing said asynchronous header to be initiated by said user computer, said asynchronous header causing said user computer to generate a first password;

said user computer transmitting a password verification request to said central rental facility, said central rental facility generating and transmitting a second password to said user computer in response to said password verification request;

said user computer using said asynchronous header for continuously checking to determine if said second password matches said first password, said asynchronous header terminating said rental application when said first and second passwords do not match.

10. The method of claim 9 further comprising the step of transferring said communication manager from said central rental facility to said user computer.

11. The method of claim 9 wherein said rental application is selected using a directory request module for browsing said plurality of rental applications.

12. A method for securely executing software, comprising the steps of:

establishing a communication between a first computer and a second computer;

selecting at least one application software from a plurality of application software stored in said second computer;

transferring said at least one application software from said second computer to said first computer;

recording a transfer time in said second computer for said at least one application software when said at least one application software is transferred, wherein said transfer time is used by said first computer to generate a first password;

executing said at least one application software on said first computer;

said at least one application software initiating an asynchronous header; and checking said first password generated by said first computer using said asynchronous header;

said asynchronous header maintaining said communication continuous when said first password is verified;

said asynchronous header repeating said checking step until said first password is not verified;

said asynchronous header terminating said communication and said at least one application software when said first password is not verified.

13. The method of claim 12 wherein said transfer time is transmitted from said second computer to said first computer.

14. The method of claim 13 wherein an application identification number for said at least one application software is transmitted to said second computer, wherein said application identification number is used by said second computer to generate a second password.

15. A method for securely executing software, comprising the steps of:

establishing a communication between a first computer and a second computer, said step of establishing said communication comprises the steps of:
 executing a communication manager on said first computer; and
 said first computer accessing said second computer using said communication manager to transfer said at least one application software from said second computer to said first computer;

transferring said at least one application software from said second computer to said first computer;

executing said at least one application software on said first computer; said at least one application software initiating an asynchronous header, said step of initiating an asynchronous header comprising the steps of:
 generating by said first computer a transfer time request;
 transmitting, by said application software being executed on said first computer, said transfer time request comprising a user identifier and an application identifier of said application software to said second computer;
 checking said communication manager using said asynchronous header for a transfer time response from said second computer when a first time interval elapses;
 said asynchronous header receiving said transfer time response from said communication manager when said second computer transmits said transfer time response; and checking a first password generated by said first computer using said asynchronous header;

said asynchronous header maintaining said communication continuous when said first password is verified;

said asynchronous header repeating said checking step until said first password is not verified;

said asynchronous header terminating said communication and said at least one application software when said first password is not verified.

16. The method of claim 15 wherein said step of verifying said first password using said asynchronous header comprises the steps of:

(a) obtaining a current time of said first computer using said asynchronous header;

(b) computing said first password dependent on a time difference between said current time of said first computer and said transfer time and storing said first password in said first computer; and (c) transmitting a password verification request comprising said current time to said second computer;

(d) said asynchronous header checking said communication manager for a password response when a second time interval elapses;

(e) receiving said password response comprising a second password from said second computer when said second time interval elapses;

(f) comparing said second password from said second computer and said first password of said first computer using said asynchronous header; and (g) said asynchronous header terminating said rental application when said second password does not match said first password, said asynchronous header allowing a third time interval to elapse and repeating steps (a)–(g) when said second password matches said first password.

* * * * *